Patented Sept. 30, 1941

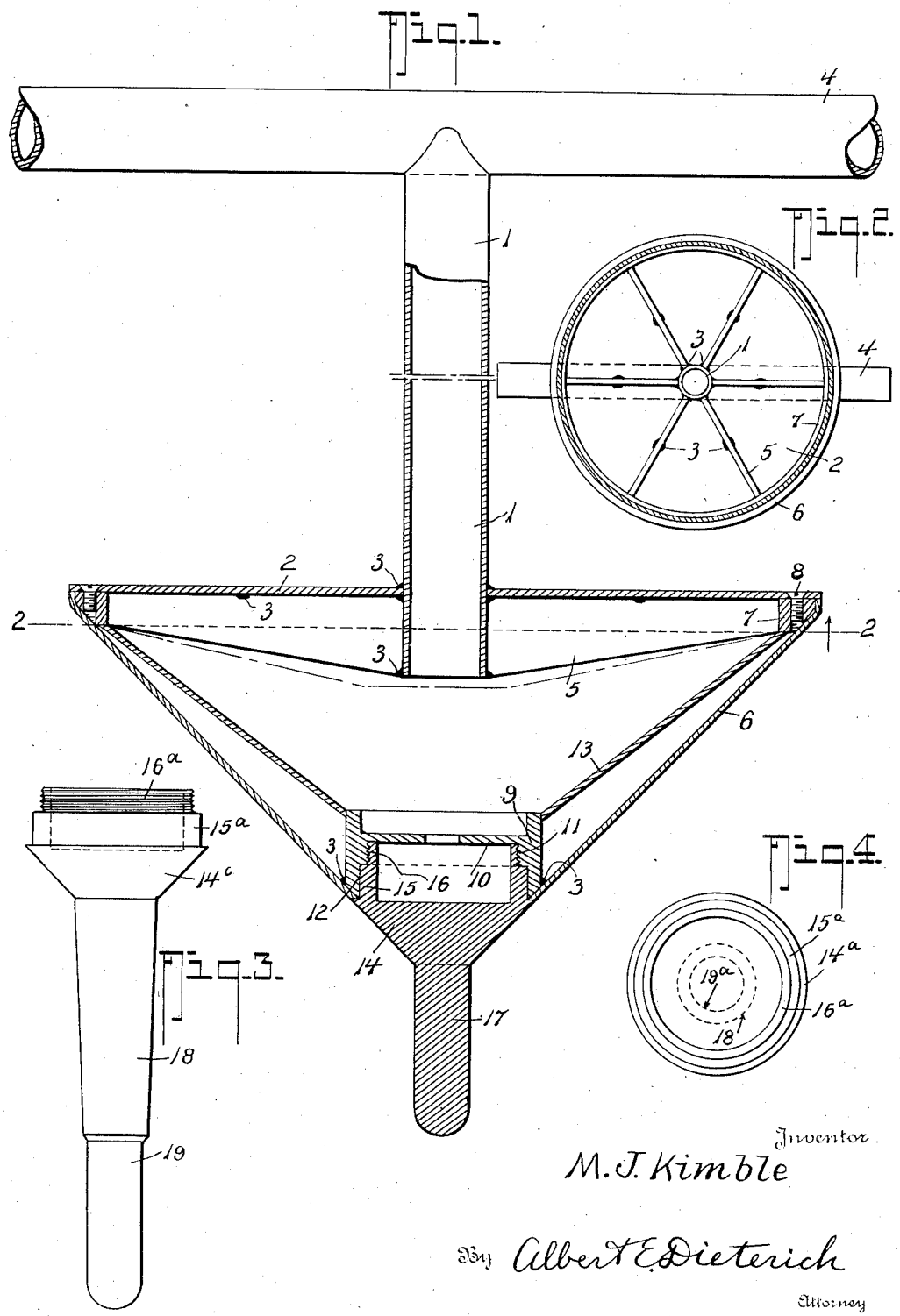

2,257,528

UNITED STATES PATENT OFFICE 2,257,528

PLANT SETTER

Murl John Kimble, Billings, Mont.

Original application April 26, 1940, Serial No. 331,879. Divided and this application filed February 10, 1941, Serial No. 378,295

4 Claims. (Cl. 111—99)

My invention relates to implements used in the setting of young plants in the ground and for planting corn and bean seeds in cone recesses under hot caps.

It has for an object to provide a strong, inexpensive-to-manufacture implement which, when pressed into the ground, will provide a conical recess at the bottom of which will be formed a smaller recess or pocket for the reception of the roots of a plant and the root-covering earth (or seeds, accordingly as young plants or seeds are being planted), thereby leaving around the plant a shallow well or cone-shaped depression in the soil so that when a hot-cap is placed over the well the cubic air space is increased over that of the cap itself, so that frost-bite and sunburn are greatly reduced; also, when the depression is left uncapped, it forms a convenient receptacle for water when watering the plants.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a central vertical longitudinal section and part elevation of my invention, a part of the handle being cut away between the dot and dash lines.

Fig. 2 is a section on the line 2—2 of Fig. 1 but on a smaller scale.

Fig. 3 is an elevation of a penetrating element to be used in lieu of that shown in Fig. 1 when planting tomatoes, the shorter penetrating element shown in Fig. 1 being used to form the pocket in which cabbage, cauliflower, peppers, egg-plant, broccoli, etc. are planted.

Fig. 4 is a top plan view of the element shown in Fig. 3.

In the drawing, in which like numerals of reference indicate like parts in all the figures, 1 is a tube or pipe, in practice of a length of about thirty inches, to the lower end of which is secured a disc 2 of about nine inches diameter in practice. The disc 2 is braced or stiffened by radial braces 5 welded to the disc and to the tube 1 as at 3, or otherwise suitably rigidly secured so that tube 1, disc 2 and braces 5 constitute an integral structure. The braces 5 terminate short of the periphery of the disc 2 to leave room for the shell ring 7 which is permanently secured to the frusto-conical shell 6 by welding, or any other suitable means. The ring 7 and disc 2 are detachably secured rigidly together by screws 8.

At its end of lesser diameter, the shell 6 is permanently secured to the coupling member 9. This member 9 may have a web 10. It has a threaded recess 11 and a counter bore 12 into which is screwed the penetrating element.

The penetrating element comprises a head and a threaded portion 16 and a shouldered part 15 to fit the threaded recess 11 and the counter bore 12 respectively. The penetrating element also includes a frusto-conical part 14 whose surface constitutes an approximate continuation of that of the shell 6.

13 designates another frusto-conical shell located between the ring 7 and the coupling member 9 and, as shown, it aids in stiffening the structure.

From the part 14 there depends a pin 17 which, in the embodiment shown in Fig. 1, is a short pin and is used when planting cabbage, cauliflower, peppers, egg-plant, broccoli, etc.

Figs. 3 and 4 show a substitute penetrating element for that shown in Fig. 1. In this form, the head is provided with a long pin composed of the tapered length 18 and the straight-end length 19 and is used when planting tomato vines. In Figs. 3 and 4, those parts which are of like construction to parts in Fig. 1 bear the same reference number plus the index letter *a*. Therefore, a repetition of the description of the same, at this time, is unnecessary.

This application is a division of my application filed April 26, 1940, Serial Number 331,879.

From the foregoing description, taken in connection with the accompanying drawing, it is thought the construction, operation and advantages of the invention will be apparent to those skilled in the art.

While I have illustrated the preferred embodiment of the invention, I do not wish to be limited to the precise construction shown, as changes in the details of construction, arrangement and design of parts can readily be made without departing from the invention within the scope of the appended claims.

What I claim is:

1. An appliance for the purposes described, comprising an elongated tube, a disc rigidly secured adjacent one end of the tube, a handle secured to the other end of the tube, a frusto-conical shell, means to secure said shell at its end of greater diameter to said disc, a coupling member rigidly secured within said shell to its end of lesser diameter, and a penetrating element removably secured to said coupling member and having a frusto-conical portion whose surface constitutes an approximate continuation of that of said shell, and having a cylindrical extension from the end of said frusto-conical porttion which is of the lesser diameter.

2. An appliance for the purposes described, comprising an elongated tube, a disc rigidly secured adjacent one end of the tube, a handle secured to the other end of the tube, a frusto-conical shell, means to secure said shell at its end of greater diameter to said disc, a coupling member rigidly secured within said shell to its end of lesser diameter, and a penetrating element removably secured to said coupling member and having a frusto-conical portion whose surface constitutes an approximate continuation of that of said shell, and having a cylindrical extension from the end of said frusto-conical portion which is of the lesser diameter, said extension comprising a tapered length and a straight pin end length.

3. An appliance for the purposes described, comprising an elongated body, a disc rigidly secured adjacent one end of the body, a handle secured to the other end of the body, a frusto-conical shell, means to secure said shell at its end of greater diameter to said disc, a coupling member rigidly secured within said shell to its end of lesser diameter, and a penetrating element removably secured to said coupling member, said penetrating element including a head and a penetrating pin projecting from the head in alignment with said elongated body when the parts are assembled.

4. An appliance for the purposes described, comprising an elongated body, a disc rigidly secured adjacent one end of the body, a handle secured to the other end of the body, a frusto-conical shell secured at its end of greater diameter to said disc, a coupling member rigidly secured within said shell to its end of lesser diameter, and a penetrating element removably secured to said coupling member, said penetrating element including a head and a penetrating pin projecting from the head in alignment with said elongated body when the parts are assembled, said coupling member having a threaded recess and a counter sunk portion and said head having a threaded portion to engage said threaded recess and having a portion to fit said counter sunk portion.

MURL JOHN KIMBLE.